(12) United States Patent
Pavlak et al.

(10) Patent No.: US 7,436,841 B2
(45) Date of Patent: Oct. 14, 2008

(54) PRESENCE FUNCTIONALITY IN THE H.323 PROTOCOL

(75) Inventors: Zdeslav Pavlak, Asker (NO); Geir Sørbotten, Slependen (NO); Espen Iveland, Drammen (NO)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 870 days.

(21) Appl. No.: 10/478,125

(22) PCT Filed: May 24, 2002

(86) PCT No.: PCT/NO02/00181

§ 371 (c)(1),
(2), (4) Date: Nov. 19, 2003

(87) PCT Pub. No.: WO02/098104

PCT Pub. Date: Dec. 5, 2002

(65) Prior Publication Data

US 2004/0141500 A1    Jul. 22, 2004

(30) Foreign Application Priority Data

May 28, 2001   (NO) .................................. 20012608

(51) Int. Cl.
*H04L 12/28* (2006.01)
(52) U.S. Cl. ...................................... 370/401; 455/433
(58) Field of Classification Search ................. 370/465, 370/401, 389, 351, 352, 402, 349, 393, 392, 370/395.54, 395.31; 455/445, 410, 461, 455/433, 435.1
See application file for complete search history.

(56) References Cited

U.S. PATENT DOCUMENTS

| | | | |
|---|---|---|---|
| 6,363,065 B1 * | 3/2002 | Thornton et al. | 370/352 |
| 6,738,383 B1 * | 5/2004 | Kliland et al. | 370/401 |
| 6,751,459 B1 * | 6/2004 | Lee et al. | 455/445 |
| 6,785,223 B1 * | 8/2004 | Korpi et al. | 370/218 |
| 6,983,311 B1 * | 1/2006 | Haitsuka et al. | 709/217 |
| 7,191,447 B1 * | 3/2007 | Ellis et al. | 719/310 |
| 7,197,766 B1 * | 3/2007 | Raestad et al. | 726/14 |

* cited by examiner

*Primary Examiner*—Brenda Pham

(57) ABSTRACT

A Present Application Server (PAS) is holding a presence list for each user is introduced. The presence list of a first user comprises other network registered users for which the first user, wants to track the registration status. The registration status of each user corresponds to the user's registration status in their associated Gatekeepers. Each time a change in registration status for a user occurs in its associated Gatekeeper, the Gatekeeper will send a message including an identification of both the user and the Gatekeeper, in addition to information concerning the change of status (register or unregister). The presence lists affected by the change of the registration status of said user is updated in the PAS. Then the associated users are informed by messages sent from the PAS via the Gatekeeper to the user's EndPoints. The messages are adapted to refresh URL's at the EndPoints pointing at the user's presence list.

7 Claims, 4 Drawing Sheets the system concept overview

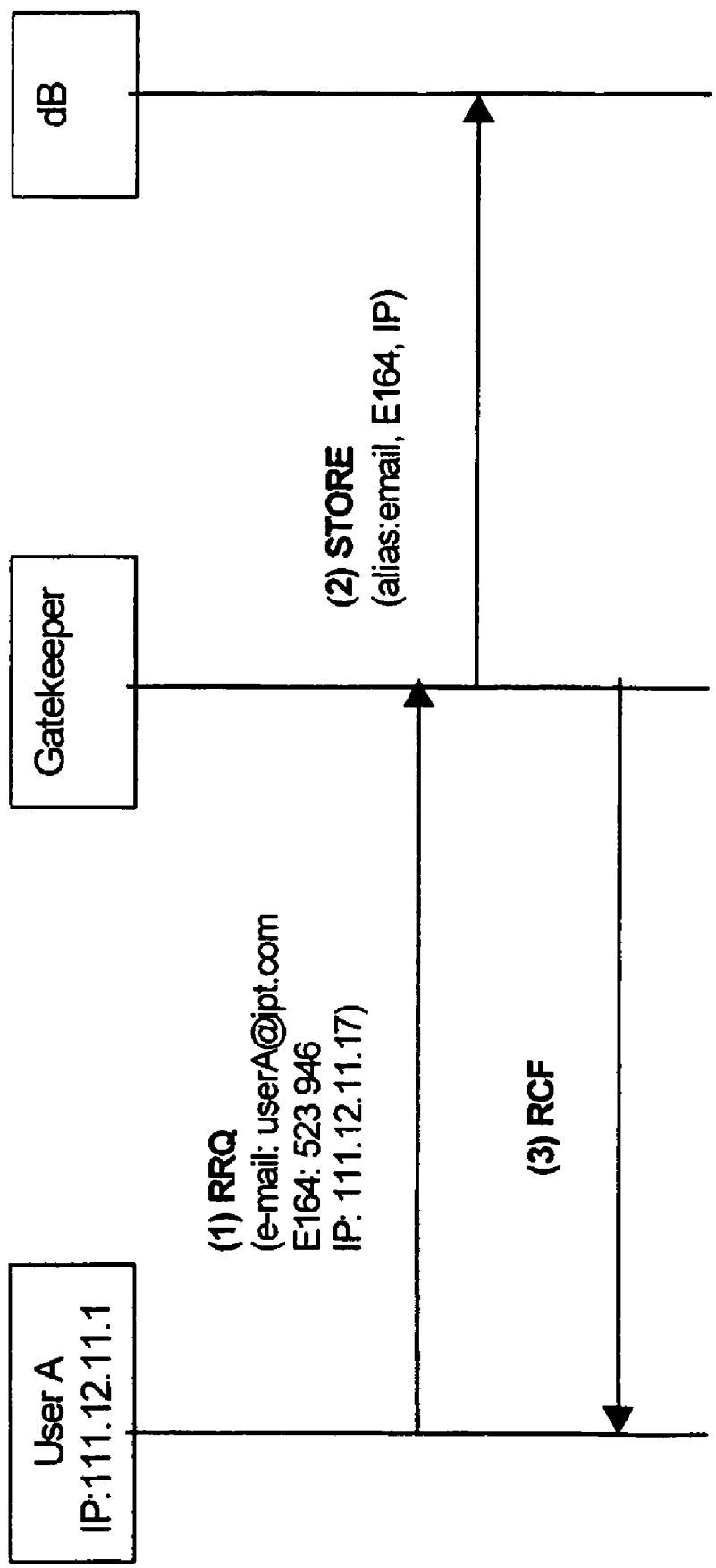
Figure 1 Normal registration procedure in H.323 based system

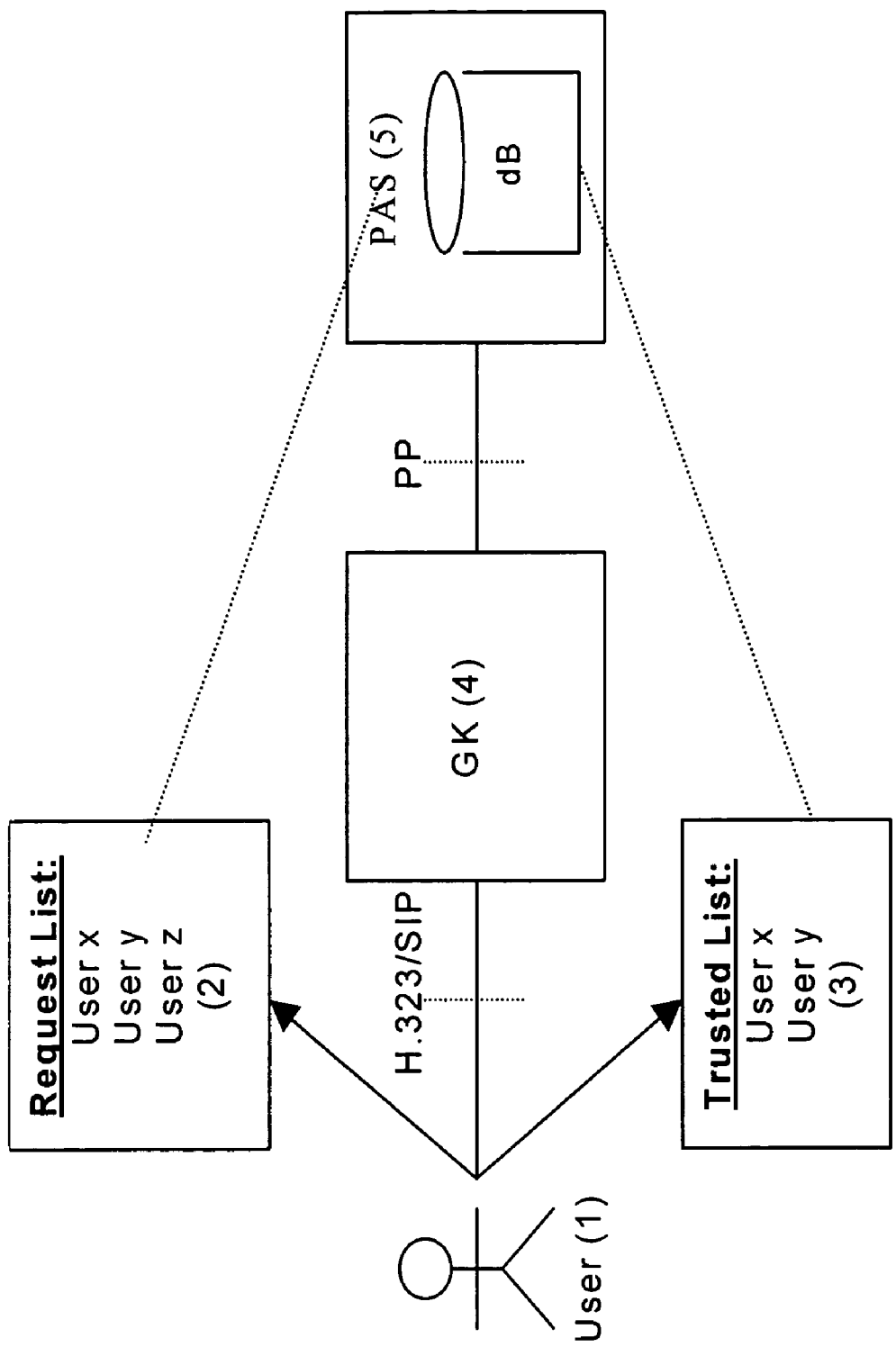
Figure 2 the system concept overview

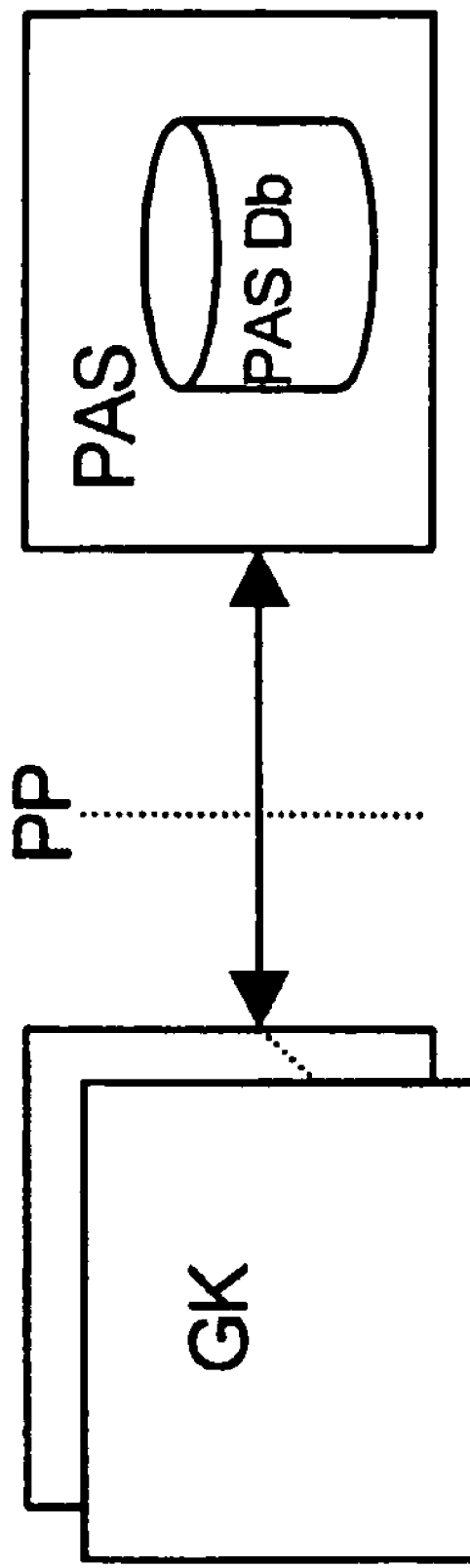
Figure 3 the relationship between GK's and PAS

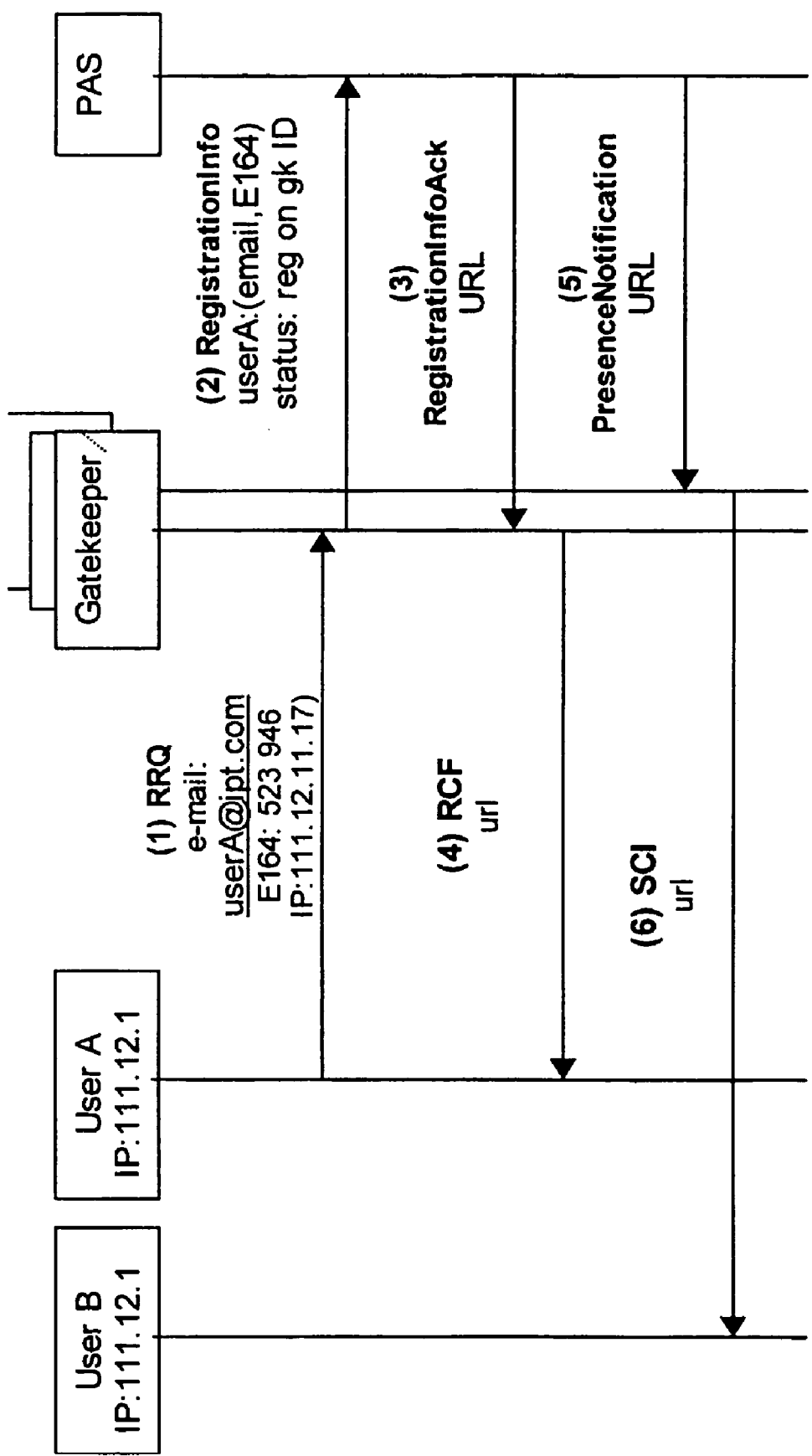
Figure 4: Normal presence procedure using Annex K

PRESENCE FUNCTIONALITY IN THE H.323 PROTOCOL

FIELD OF THE INVENTION

The present invention is related to packet-based multimedia communication systems, especially presence functionality related to the H.323 protocol.

BACKGROUND OF THE INVENTION

Presence and chat applications (e.g. ICQ on the Internet) are gaining popularity. These applications are based on that the users register their presence and may be visible on other users contact or buddy lists. An example of such an application is ICQ. ICQ is a presence and chat service on the Internet. ICQ allows you to know which of your friends that are online, and you may use a variety of communication techniques to contact them. It is also integrated with Microsoft NetMeeting.

This is for the time being the most common application, but other presence applications are expected to be common in the near future. An example of such an application is a localization application by which a group of users are informed e.g. via a map on a terminal screen where the other users currently are positioned. The positions may be provided by a GPS receiver placed in each user's terminal. Especially this last mentioned application or similar applications are expected to become popular services, and therefore, presence application will probably occur in an increasing number of associations.

As also IP telephony becomes more customary, it is clear that there is a need for solutions implementing presence applications therein. H.323 is today one of the most widespread protocol for IP telephony or more generally for multimedia communication where the underlying transport is a Packet Based Network. The description in this application is applied to this protocol, and associated terminology, well known to persons skilled in the art, will be used.

According to the H.323 standard, user registration into a network is arranged by so-called Gatekeepers.

The H.323 protocol describes/provides the procedure for the user registration. The user registration is basically a relation between the user identifiers (called aliases in H.323) e.g. E.164 numbers or e-mail addresses and the users current IP address. See FIG. 1.

When a User A registers into the H.323 based system, its endpoint, representing the users terminal, sends the information about the IP address associated with that endpoint. This information is encapsulated in a registration request message (RRQ) and sent to a H323 Gatekeeper (GK) (1). The relevant information from the RRQ message is then stored in a dB (2). As an acknowledgement to the user about its registration, the GK responds with a registration confirmation message (RCF), (3). This is a normal registering procedure in H.323 based systems.

The User A is now recognised within the system under aliases E164: 523 946, e-mail: userA@ipt.com and can be contacted on IP:111.12.11.17.

H.323 is based on users registering into a network, but there is currently no way to provide the already existing registration status (presence) to other users in the H.323. Consequently, there is currently no way other users can find out if User A is registered or not, and User A can not notify his friends about his/hers presence in the system using H.323.

ICQ is a presence and chat service on the Internet. ICQ allows you to know which of your friends that are online, and you may use a variety of communication techniques to contact them. It is also integrated with Microsoft NetMeeting, which in fact is a H.323 endpoint.

However, if you want to be registered into a H.323 network, you would have to register both in ICQ and the H.323 network, and you will not know if other users registered in ICQ also are registered in a H.323 network. ICQ does not make use of the information already stored in the Gatekeepers whether a user is logged in or not.

SIP is another protocol that may be used for IP telephony. SIP, like H.323, uses registrations to map user identifiers to host names and thereby IP addresses. SIP has proposed extensions for presence handling. The mechanism is based on that a user may send a SUBSCRIBE message to subscribe to other users registrations, and will get a NOTIFY message when one of these users changes his/her registration status.

However, this is a mechanism for SIP protocol, and is not applicable for equipment using the H.323 protocol. Therefore, none of the above mentioned known solutions solve the problem of relating presence information to registration status in an H.323 network.

SUMMARY OF THE INVENTION

It is an object of the present invention to provide a method that eliminates the drawbacks described above. The features defined in the claims enclosed characterize this method.

More specifically, the present invention introduces a Present Application Server (PAS) holding a presence list for each user. The presence list of a first user comprises other network registered users for which the first user, according to a predefined request list stored in the PAS, wants to track the registration status. However, according to a preferred embodiment of the present invention, a second user, not having the first user in an associated trust list, will not be included in the presence list of the first user even if the second user both is registered in the communication network and included in the request list of the first user.

The present invention is applied to the H.323 standard, and the registration status of each user corresponds to the user's registration status in their associated Gatekeepers. Each time a change in registration status for a user occur in its associated Gatekeeper, the Gatekeeper will send a message including an identification of both the user and the Gatekeeper, in addition to information concerning the change of status (register or unregister). As a response to this, the presence lists affected by the change of the registration status of said user is updated in the PAS. Then the associated users are informed by messages sent from the PAS via the Gatekeeper to the user's EndPoints. The messages are adapted to refresh URL's at the EndPoints pointing at the user's presence list.

The present invention make use of the registration status information already stored in the Gatekeepers. Then the users may be visible for other users in a presence application just as they are attached to a Gatekeeper.

BRIEF DESCRIPTION OF THE DRAWINGS

In order to make the invention more readily understandable, the discussion that follows will refer to the accompanying drawings.

FIG. 1 shows a normal registration procedure in an H.323 based system.

FIG. 2 is an overview of the system concept according to the present invention

FIG. 3 shows the relationship between an H.323 Gate Keeper and the Presence Application Server (PAS) according to the present invention.

FIG. 4 shows a registration procedure in an H.323 based system using Annex K according to the present invention.

DETAILED DESCRIPTION

The present invention introduces a Presence Application Server (PAS) communicating with one or more Gatekeepers. The PAS (Presence Application Server) is handling presence services. It is separated from the gatekeeper to make the system scalable. This is shown in FIG. 2. By doing this, the PAS may be shared by many gatekeepers, even gatekeepers belonging to different H.323 operators.

According to the present invention, a User 1 will have both a request list and a trusted list in the PAS. The request list contains all the users for which User 1 wants registration status. The trusted list contains all the users that User 1 allows to be notified when his/her registration status changes.

The PAS has to correlate these lists with registration status and thereby make one presence list for User 1 containing the currently registered users included in the request list of User 1. A user in the presence list of User 1 also have to have User 1 included in its trusted list. If not, the user will be excluded from the presence list of User 1 even if it is both registered and included in the request list of User 1.

This may be exemplified by the following tables including the request lists and trust lists of User 1, User 2, User 3 and User 4, respectively.

| User | Registered | Request List | Trust List |
| --- | --- | --- | --- |
| User 1 | GK A | User 2, User 3, User 4 | User 2, User 3 |
| User 2 | No | User 1, User 3 | User 1, User 3 |
| User 3 | GK B | User 1, User 2, User 4 | User 1, User 2, User 4 |
| User 4 | GK B | User 1, User 3 | User 3 |

The PAS will in this case have the following compiled presence lists for the users:

| User | Presence List |
| --- | --- |
| User 1 | User 3 |
| User 2 | Not registered |
| User 3 | User 1, User 4 |
| User 4 | User 3 |

The connection between the GK and the PAS is structured with the PAS as a server and the GK as a client. Initially the GK may be pre-registered at the PAS. The protocol used between the GK and the PAS, may be a "presence protocol" (PP), which is known for persons skilled in the art, and has the following characteristics:

- The GK may be pre-registered at the PAS.
- Provides a communication between the GK and PAS.
- The GK sends messages related to user registrations to the PAS.
- The PAS sends events related to user presence information to the GK's.

The messages sent to the PAS includes one or more user IDs, the ID of the corresponding GK and the operation: register or unregister. The events sent from PAS to GK's contain user ID and a presence information. FIG. 3 shows the relationship between the GK and the PAS.

As earlier mentioned, PP is the interface between the H.323 GK and the PAS. This protocol could be part of a standard service API like Parlay, an extension to H.323, XML based or based on other applicable protocols. The exact syntax and transport mechanism for this protocol is outside the scope of this invention.

The PP interface consist of the following components:

RegistrationInfo. Info sent by the client (GK). This info contains a user ID, GK ID with an operation: register or unregister.

RegistrationInfoAck. A response to RegistrationInfo containing presence information for the registered user.

PresenceNotification. The event could be triggered by PAS when a RegistrationInfo message is received. This event contains a user ID and presence information.

According to a preferred embodiment, the present invention is realized by using H.323 Annex K. Annex K describes a service independent HTTP based transport channel where H.323 messages are used for transporting the URL for the services.

Realisation of a presence service based on Annex K is shown on FIG. 4. Given that the user A has received an URL from its service provider.

During the registration procedure, the terminal of user A sends a RRQ message to user A's GK, (1). Parts of the registration information is encapsulated in a RegistrationInfo message and sent to the PAS, (2). The PAS returns an URL pointing to User A's compiled presence list to the user's GK in RegistrationInfoAck (3). The gatekeeper will then include this URL in the ServiceControlSession structure in the RCF (4).

At the same time the PAS will send notifications to all users that are subscribing to registration events for User A. This is done by sending a PresenceNotification to the gatekeepers of these users in which a URL pointing to an updated presence list (5) for each of these users is included.

The gatekeepers will in turn send a ServiceControlIndication message to the users endpoints (6), which will display/refresh the URL to get the latest presence information.

Unregistration is handled in a similar way. The RegistrationInfo messages will have status unreg instead of reg, and no URL will be returned in RegistrationInfoAck. (5) and (6) will be the same.

The present invention in the H.323 system is a supplement to already existing registration functionality. The registration functionality is extended with additional services allowing the user to be provided with information about the current registration of his/hers friends and to "publish" information about own registration.

The present invention make use of the registration status information already stored in the Gatekeepers. Then the users may be visible for other users in a presence application just as they are attached to a Gatekeeper.

The invention is also applicable in conjunction with location functionality. The additional information about users physical location in terms of e.g. GPS (Global Positioning System) co-ordinates could be transferred to the PAS, assuming that the user terminal supports GPS.

In fact, there are no restrictions in what kind of information that might be attached to each user in the presence list.

Finally, according to the present invention, it should be possible to let the same PAS also handle presence information from others than H.323 users, e.g. SIP users.

REFERENCES

ITU-T Recommendation H.323, Packet-Based Multimedia Communications Systems, version 4.

ICQ (http://web.icq.com/)

M. Handley/H. Schulzrinne/E. Schooler/J. Rosenberg, "SIP: Session Initiation Protocol", RFC 2543, IETF; March 1999.

J. Rosenberg et. al., "SIP Extensions for Presence", <draft-rosenberg-impp-presence-00.txt>, IETF; June 2000. Work in progress A. Roach, "Event Notification in SIP", <draft-roach-sip-subscribe-notify-03.txt>, IETF; February 2001. Work in progress.

H.323 Annex K (HTTP based service Control Transport Channel)

The invention claimed is:

1. A method for tracking a registration status of one or more users in a communication network according to H.323 or SIP standard, said users associated to a Gatekeeper (GK) administrating registrations and unregistrations of said users, each user accessing the communication network through an associated EndPoint of the communication network, the method comprising:

sending a first message from said Gatekeeper to a Presence Application Server (PAS) which holds a presence list for each of the users for tracking user registration status, each time one of the users changes registration status in the communication network, wherein a first user is included in a presence list corresponding to a second user, said first message includes a user identification of the current user, a Gatekeeper identification, and the change of registration status for said user, returning, from said PAS to said GK, a URL pointing to the presence list of said user, updating presence lists affected by the change of the registration status of said user accordingly, sending, from said PAS, a second message to the Gatekeeper notifying the Gatekeeper about the updating.

2. The method according to claim 1, wherein the first user is included in the presence list corresponding to a second user if all of the following three criteria are fulfilled:

the first user is registered, through the Gatekeeper, in the communication network;

the first user is included in a request list corresponding to the second user; and the second user is included in a trust list corresponding to the first user.

3. The method according to claim 2, wherein said request list corresponding to the second user is a predefined list including all users for whom the second user wants to track the registration status.

4. The method according to claim 3 wherein said trust list corresponding to the first user is a predefined list including all users that the first user allows to be notified when the first user changes registration status.

5. The method according to claim 4 wherein communication between the PAS and the Gatekeeper is carried through by means of a Presence Protocol (PP) wherein the PAS acts as a server and each GK as a client.

6. The method according to claim 5 wherein the step of sending the second message precedes sending a third message from the Gatekeeper to the users whose presence lists have been updated, said third message adapted to refresh a URL, localized in each of those user's EndPoints pointing to the associated presence list.

7. A Presence Application Server (PAS) for tracking a registration status of one or more users in a communication network according to H.323 or SIP standard, said users associated to a Gatekeeper (GK) administrating registrations and unregistrations of said one or more users, each user accessing the communication network through an associated EndPoint of the communication network, the PAS comprising:

means for communicating with the GK, the PAS receiving a first message indicating change in registration status of a first user, the first message including a user identification of a user, a GK identification and change of registration of the user;

means for storing a presence list for each user subscribing to a presence service associated with the PAS, wherein a first user is included in a presence list corresponding to a second user;

means for sending to the GK a URL that points to the presence list of the subscribing user;

means for updating the presence list of each user according to registrations and unregistrations of each of the users into or from the communication network that utilize the Gatekeeper.

* * * * *

UNITED STATES PATENT AND TRADEMARK OFFICE
CERTIFICATE OF CORRECTION

PATENT NO. : 7,436,841 B2
APPLICATION NO. : 10/478125
DATED : October 14, 2008
INVENTOR(S) : Pavlak et al.

It is certified that error appears in the above-identified patent and that said Letters Patent is hereby corrected as shown below:

On the Title Page, in Item (57), under "ABSTRACT", in Column 2, Line 1, delete "Present" and insert -- Presence --, therefor.

On the Title Page, in Item (57), under "ABSTRACT", in Column 2, Line 1, after "(PAS)" delete "is".

On the Title Page, in Item (57), under "ABSTRACT", in Column 2, Line 4, after "track" delete "the".

In Fig. 4, Sheet 4 of 4, delete " 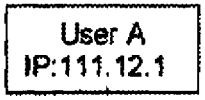 " and insert -- 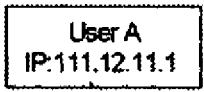 --, therefor.

In Column 1, Line 50, delete "H323" and insert -- H.323 --, therefor.

In Column 2, Line 64, delete "invention" and insert -- invention. --, therefor.

Signed and Sealed this

Twenty-eighth Day of April, 2009

JOHN DOLL
*Acting Director of the United States Patent and Trademark Office*